US008433800B2

(12) United States Patent
Chor

(10) Patent No.: US 8,433,800 B2
(45) Date of Patent: Apr. 30, 2013

(54) SMART LINK SYSTEM AND METHOD

(75) Inventor: Jesse Chor, Bellevue, WA (US)

(73) Assignee: Mskynet Inc., Seattle, WA (US)

( * ) Notice: Subject to any disclaimer, the term of this patent is extended or adjusted under 35 U.S.C. 154(b) by 265 days.

(21) Appl. No.: 13/036,950

(22) Filed: Feb. 28, 2011

(65) Prior Publication Data

US 2012/0221724 A1   Aug. 30, 2012

(51) Int. Cl.
*G06F 15/173* (2006.01)
*G06F 15/16* (2006.01)
*G06F 17/00* (2006.01)

(52) U.S. Cl.
USPC ........... 709/225; 709/219; 709/236; 709/201; 709/202; 709/203; 725/32; 725/37; 725/46; 715/209; 715/210

(58) Field of Classification Search .................. 709/115, 709/219, 236, 201, 202, 203, 217
See application file for complete search history.

(56) References Cited

U.S. PATENT DOCUMENTS

| 7,779,149 | B2 * | 8/2010 | Doi et al. ..................... 709/236 |
| 2002/0092019 | A1 * | 7/2002 | Marcus ........................... 725/37 |
| 2004/0267908 | A1 * | 12/2004 | Doi et al. ..................... 709/219 |
| 2006/0015904 | A1 * | 1/2006 | Marcus ........................... 725/46 |

OTHER PUBLICATIONS

Berners-Lee T et al, "Uniform Resource Identifier (URL): Generic Syntax," Network Networking Group Request for Comments, Adobe Systems, Jan. 2005, pp. 1-62.
Fielding, R, "Relative Uniform Resource Locators," Network Networking Group Request for Comments, UC Irvine, Jun. 1995, pp. 1-15.
"UI Application Reference," Apple Computer, Cupertino CA, Sep. 2010; pp. 1-44.
"NSURL Class Reference," Apple Computer, Cupertino CA, Sep. 2010; pp. 1-42.
"iTunes Link Maker FAQ," apple.com, 2011.
"Apple URL Scheme Reference" Apple Computer, Cupertino CA, Jun. 2009, pp. 1-42.

* cited by examiner

*Primary Examiner* — Jude Jean Gilles
(74) *Attorney, Agent, or Firm* — AEON Law; Adam L.K. Philipp

(57) ABSTRACT

A resource may be identified according to multiple Uniform Resource Locators ("URL") according to systems and methods for encapsulating an alternative URL inside a primary "carrier" URL to form a compound URL or "smart link" and for processing smart links thereby formed. A preferred URL may be encapsulated into a smart link for use by client devices that support handling of the preferred URL, while other client devices may use a default or fallback URL that is also encapsulated into the smart link. The alternative URL is indicated by a pre-determined key included in the primary carrier URL.

20 Claims, 10 Drawing Sheets

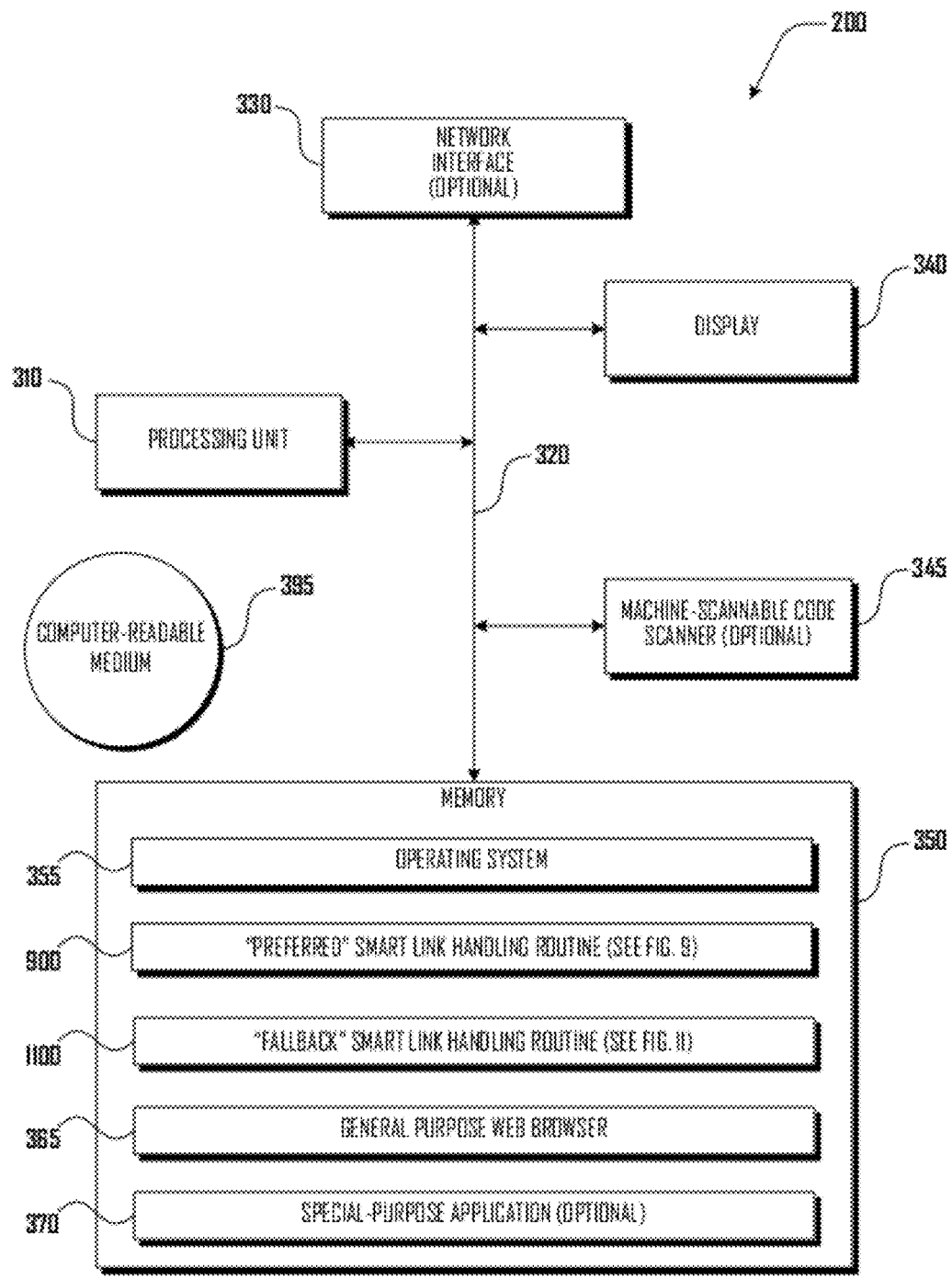

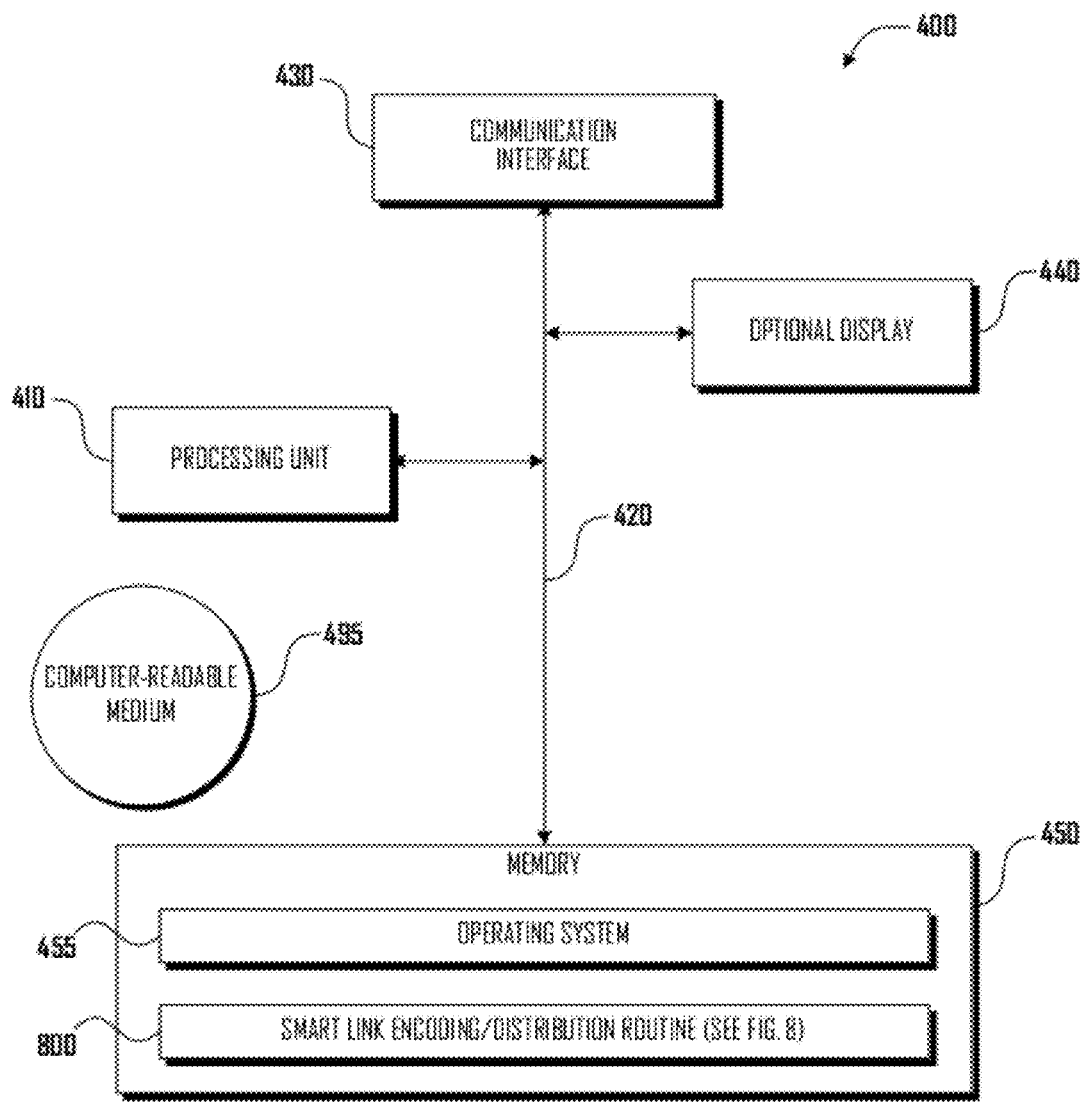

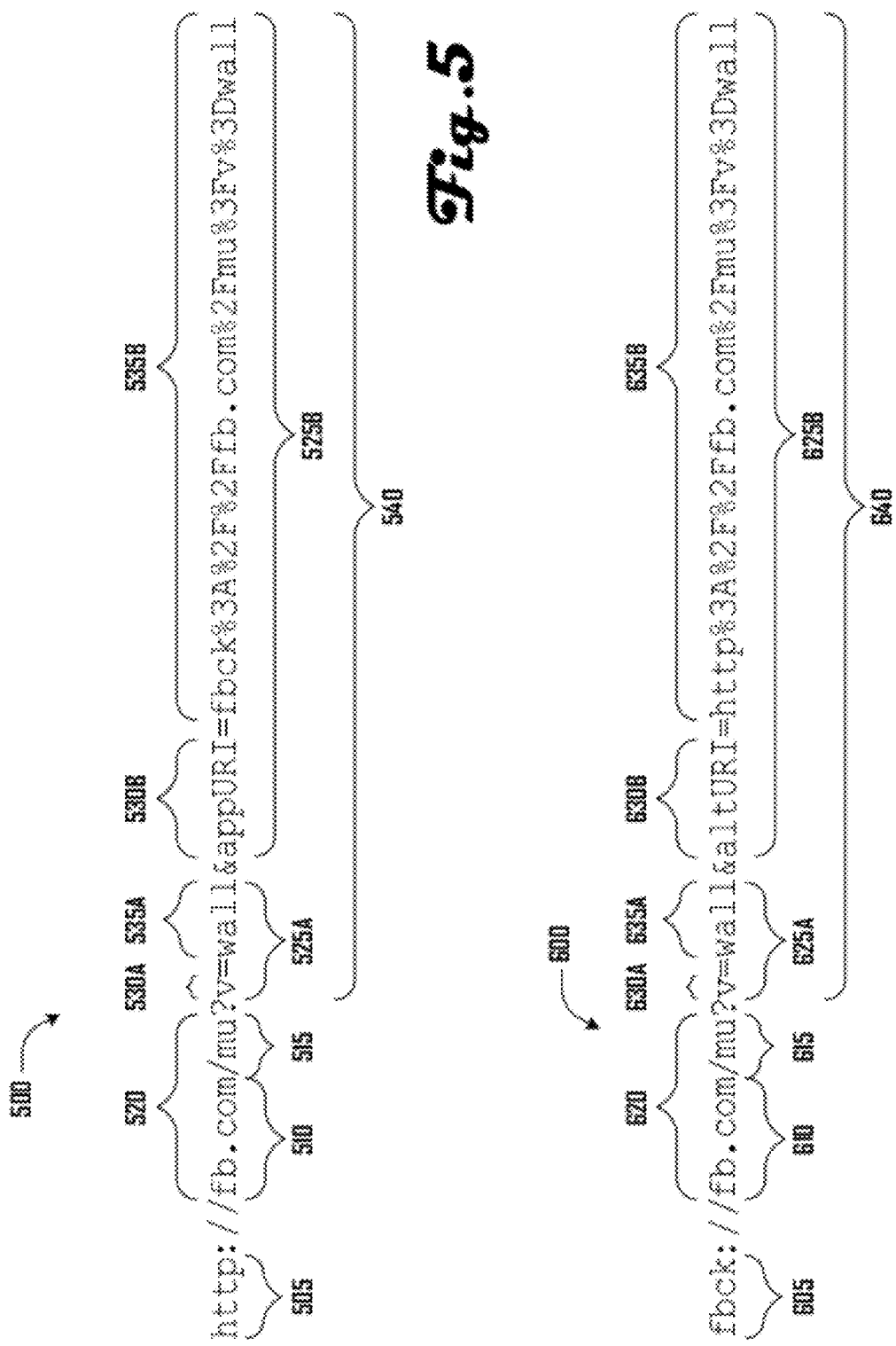

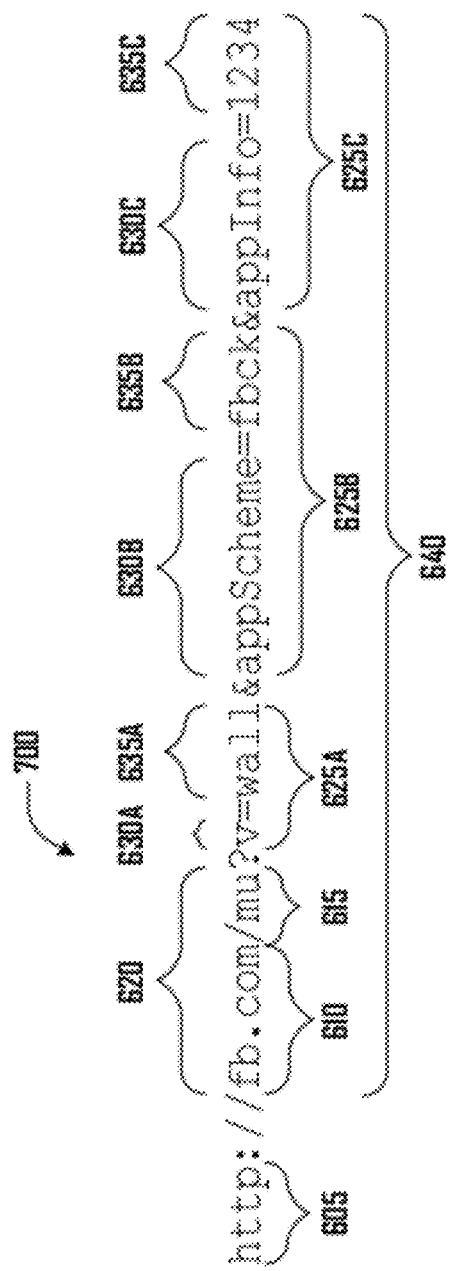

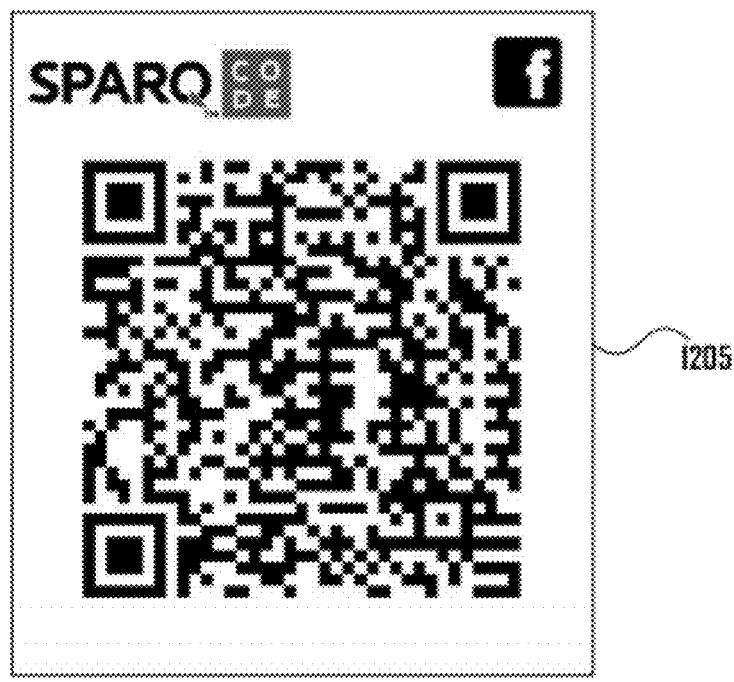
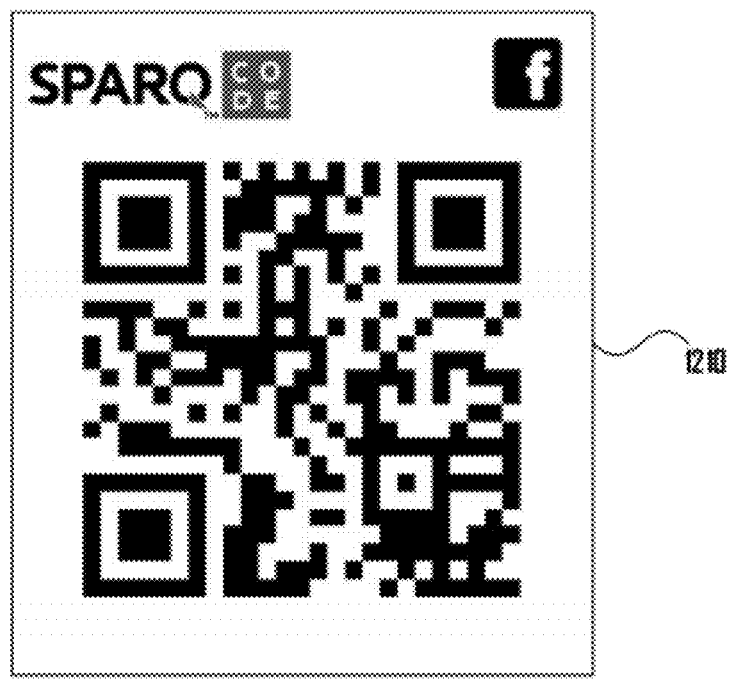
Fig.12

SMART LINK SYSTEM AND METHOD

FIELD

The present disclosure relates to networked computing services, and more particularly to generating and handling compound URLs that encapsulate an alternative URL inside a primary "carrier" URL.

BACKGROUND

A Uniform Resource Identifier ("URI"), as the term is used herein, is a string of characters used to identify a resource on a computing device and/or a network, such as the Internet. Such identification enables interaction with representations of the resource using specific protocols. "Schemes" specifying a syntax and associated protocols define each URI.

A Uniform Resource Locator ("URL") is a URI that specifies where an identified resource is available and the mechanism for retrieving it. URLs are commonly used to identify web page resources on the World Wide Web. For example, the URL "http://www.wikipedia.org/" identifies a resource (Wikipedia's home page) and implies that a representation of that resource (such as the home page's current HTML code, as encoded characters) is obtainable via the Hypertext Transfer Protocol ("HTTP") networking protocol from a network host named www.wikipedia.org.

The generic syntax for URI schemes is defined in Request for Comments ("RFC") memorandum 3986 published by the Internet Engineering Task Force ("IETF"). According to RFC 3986, a URI (including a URL) consists of four parts:

<scheme name> : <hierarchical part> [ ? <query> ] [ # <fragment> ]

FIG. 1 shows an exemplary prior-art URL 100 conforming to this structure.

A URI (e.g., URI 100) begins with a scheme name 105 that refers to a specification for assigning identifiers within that scheme. The scheme name 105 consists of a letter followed by any combination of letters, digits, and the plus ("+"), period ("."), or hyphen ("-") characters; and is terminated by a colon (":").

The hierarchical portion 120 of the URL is intended to hold identification information that is hierarchical in nature. Often this part is delineated with a double forward slash ("//"), followed by an optional authority part 110 and an optional path 115.

The optional authority part 110 holds an optional user information part (not shown) terminated with "@" (e.g. username:password@), a hostname (i.e., domain name or IP address, here "example.com"), and an optional port number preceded by a colon ":" (not shown).

The path part 115 is a sequence of one or more segments (conceptually similar to directories, though not necessarily representing them) separated by a forward slash ("/"). If a URI includes an authority part, then the path part may be empty.

The optional query portion 125 is delineated with a question mark and contains additional identification information that is not necessarily hierarchical in nature. Together, the path part 115 and the query portion 125 identify a resource within the scope of the URI's scheme and authority. The query string syntax is not generically defined, but is commonly organized as a sequence of zero or more <key>=<value> pairs 130, 135 separated by a semicolon or ampersand, for example:

key1=value1;key2=value2;key3=value3 (Semicolon), or
key1=value1&key2=value2&key3=value3 (Ampersand)

Much of the above information is taken from RFC 3986, which provides additional information related to the syntax and structure of URIs. RFC 3986 is hereby incorporated by reference, for all purposes.

Many web-enabled services are available via a web interface, designed to be used in a general-purpose web browser, as well as via one or more platform-specific, special-purpose applications. For example, in many desktop operating systems, YouTube videos (provided by YouTube, LLC of San Bruno, Calif.) are typically accessed via YouTube's web interface in a general-purpose web browser, whereas on iOS devices (e.g., iPhones, iPads, and the like, provided by Apple Inc. of Cupertino, Calif.), YouTube videos are typically accessed via a special-purpose iOS-native YouTube application.

Similarly, the Twitter messaging service may be accessed via a web interface in a general-purpose browser, or in any number of special-purpose applications available for many different platforms.

For yet another example, on many platforms, an Application-store may be accessible (possibly with limited functionality) via a web browser, but certain operations (e.g., purchasing an application) may be available only via a special-purpose Application-store application.

The iOS operating system includes special provisions for handling http-scheme links to resources such as YouTube videos and Google Maps locations (provided by Google Inc. of Mountain View, Calif.). For example, when an iOS application requests that a http-scheme link to a YouTube video be opened on the device, the standard iOS URL-handling routines will detect that the link is to a YouTube video (e.g., by inspecting the authority, path, and/or query portions of the URL), and invoke the special-purpose YouTube application, rather than a general-purpose web browsing application. Google Maps http-scheme links are specially detected and handled by a standardly-installed Maps application.

In many cases, a developer or other individual may wish to provide a locator or identifier for a particular resource that may be accessed via either a general-purpose web browser or a special-purpose application. For example, a developer may wish to provide a single URL that can be used to view an application either in an Application-store application or, if the Application-store application is not available on a requesting device, in a web browser.

Similar behavior exists on iOS devices for URLs to applications in the iTunes Store, but it relies on special behavior implemented by the http server responding to an URL request. For example, the following URL will be accessible via an iTunes store application on devices that have it installed; otherwise, the URL provides content via a general-purpose web browser: http://itunes.apple.com/us/artist/up-lake-media-11c/id317833657?ign-mpt=uo%3D4

When a device requests the identified resource, the http server returns a HTML page that includes javascript code for detecting whether the iTunes application is installed on the requesting device. If the javascript code indicates that the iTunes application is installed, another piece of javascript launches the iTunes application with the appropriate parameters. Otherwise, an html page is displayed in the general-purpose web browser.

For yet another example, an individual may wish to provide a single URL that can be used to view a particular social network discussion either in a dedicated social network application (if one is installed) or in a web browser (if no dedicated application is installed). However, http-scheme links to social network hosts may not be specially handled by standard URL-handling routines on any given device, and without altering the behavior of a social network host's web server (e.g., by returning javascript code that detects whether a special-purpose application is installed and redirects accordingly), it is currently difficult or impossible to provide a single URL that can alternatively invoke a special-purpose application (if installed on a device) or a general-purpose application (otherwise).

BRIEF DESCRIPTION OF THE DRAWINGS

FIG. 3 illustrates several components of an exemplary client device in accordance with one embodiment.

FIG. 4 illustrates several components of an exemplary smart link server in accordance with one embodiment.

FIGS. 5-7 show several exemplary "smart links" or compound URLs, in accordance with various embodiments.

FIG. 12 shows a pair of optically machine-scannable codes encoded with a smart link in accordance with one embodiment.

DESCRIPTION

Figure 1:
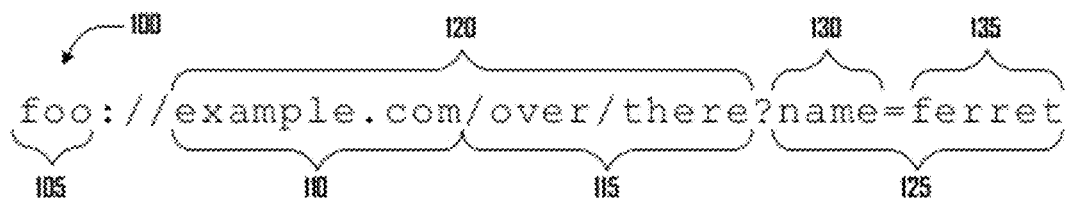
FIG. 1 shows an exemplary prior-art URL.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

In various embodiments, as discussed below, a resource may be identified according to multiple URLs by encapsulating an "alternative" URL inside a "primary" URL to form a "compound" URL, also referred to herein as a "smart link." In some cases, either the alternative URL may be usable by a special-purpose application that may or may not be installed on a client device, while the primary URL may be usable by a general-purpose application (e.g. a web browser) or other application that is standardly installed on a client device. In other cases, the primary URL may be usable by a special-purpose application that may or not be installed on a client device, while the alternative URL may be a "fallback" URL, usable by a general-purpose application (e.g. a web browser) or other application that is standardly installed on a client device. In some cases, two or more alternative URLs may be encapsulated in a single primary URL.

The one or more alternative URLs are indicated within the primary URL by a pre-determined "key" that indicates the presence of an alternative URL. In many cases, such a pre-determined key will be ignored by an authority handling access to the resource identified by the primary URL.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 2:
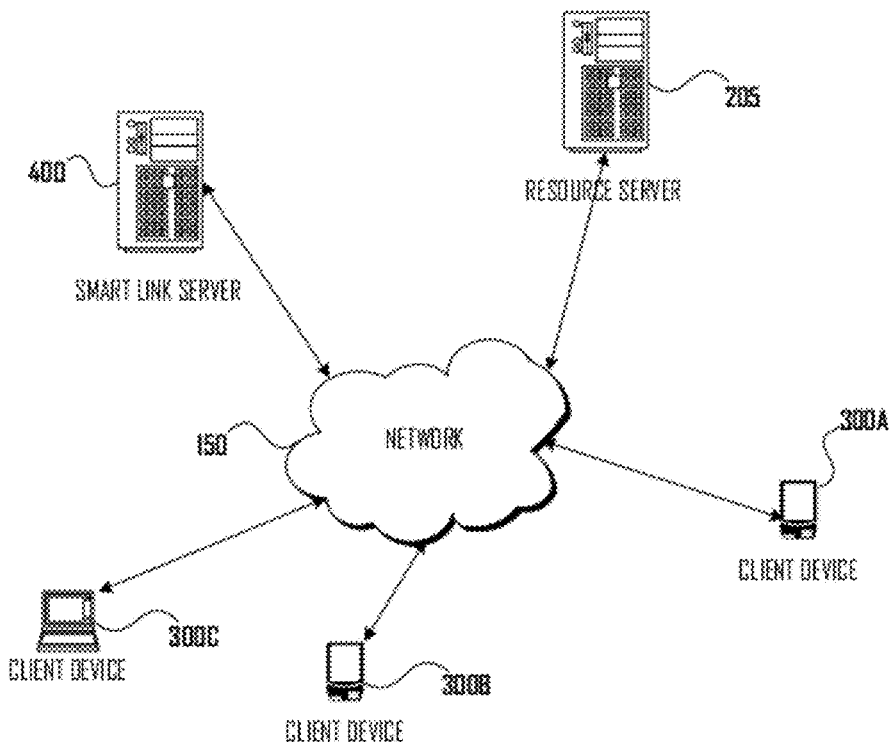
FIG. 2 illustrates an exemplary smart link system according to one embodiment.

FIG. 2 illustrates an exemplary smart link system 200 according to one embodiment in which two or more client devices 300A-C (see FIG. 3, discussed below), a smart link generation server 400 (see FIG. 4, discussed below), and resource server 205 are connected to a network 250. In some embodiments, a hostname for resource server 205 may be included in an authority portion of a URL.

In various embodiments, network 250 may include the Internet, a local area network ("LAN"), a wide area network ("WAN"), and/or other data network. In some embodiments, other servers and/or devices (not shown) may also be present. For example, in some embodiments, one or more proxy devices, firewalls, and/or other intermediaries (not shown) may exist between network 250 and one or more of the other devices shown in FIG. 2.

FIG. 3 illustrates several components of an exemplary client device 300 in accordance with one embodiment. In some embodiments, client device 300 may include many more components than those shown in FIG. 3. However, it is not necessary that all of these generally conventional components be shown in order to disclose an illustrative embodiment. As shown in FIG. 3, client device 300 includes a network interface 330 for connecting to the network 150.

The client device 300 also includes a processing unit 310, a memory 350, and a display 340, all interconnected along with the network interface 330 via a bus 320. The memory 350 generally comprises a random access memory ("RAM"), a read only memory ("ROM"), and a permanent mass storage device, such as a disk drive, flash memory, or other persistent storage technology. The memory 350 stores program code for a "preferred" smart link handling routine 900 (see FIG. 9, discussed below), a "fallback" smart link handling routine 1100 (see FIG. 11, discussed below), a general-purpose web browser 365 or other standardly-installed application (not shown) for accessing resources identified in a URL), and an optionally-installed special purpose application 370. In addition, the memory 350 also stores an operating system 355. These software components may be loaded from a computer readable storage medium 395 into memory 350 of the client device 300 using a drive mechanism (not shown) associated with a non-transient computer readable storage medium 395, such as a floppy disc, tape, DVD/CD-ROM drive, memory card, or the like. In some embodiments, software components may also be loaded via the network interface 330, rather than via a computer readable storage medium 395.

In some embodiments, client device 300 also includes a scanner 345 capable of capturing information encoded in machine-scannable codes. For example, in some embodiments, scanner 345 may comprise a camera or other optical scanner for capturing optically-encoded machine-scannable codes, such as barcodes, two-dimensional barcodes, and the like. In other embodiments, scanner 345 may comprise a radio transmitter and/or receiver for capturing radio-frequency identification ("RFID") tags and the like. In still other embodiments, scanner 345 may comprise suitable components for scanning or reading codes encoded in other machine-scannable media.

FIG. 4 illustrates several components of an exemplary smart link server 400 in accordance with one embodiment. In some embodiments, smart link server 400 may include many more components than those shown in FIG. 4. However, it is not necessary that all of these generally conventional components be shown in order to disclose an illustrative embodiment. As shown in FIG. 4, smart link server 400 includes a network interface 430 for connecting to the network 150.

The smart link server 400 also includes a processing unit 410, a memory 450, and an optional display 440, all interconnected along with the network interface 430 via a bus 420. The memory 450 generally comprises a random access memory ("RAM"), a read only memory ("ROM"), and a permanent mass storage device, such as a disk drive. The memory 450 stores program code for a smart link encoding/distribution routine 800 (see FIG. 8, discussed below). In addition, the memory 450 also stores an operating system 455. These software components may be loaded from a computer readable storage medium 495 into memory 450 of the smart link server 400 using a drive mechanism (not shown) associated with a non-transient computer readable storage medium 495, such as a floppy disc, tape, DVD/CD-ROM drive, memory card, or the like. In some embodiments, software components may also be loaded via the network interface 430, rather than via a computer readable storage medium 495.

Although an exemplary client device 300 and smart link server 400 have been described that generally conform to conventional general purpose computing devices, in various embodiments client device 300 and/or smart link server 400 may be any of a great number of devices capable of communicating with the network 150 and/or resource server 205, for example, a personal computer, a game console, a set-top box, a handheld computer, a cell phone, or any other suitable device.

FIGS. 5-7 show several exemplary "smart links" or compound URLs 500, 600, 700, in accordance with various embodiments. Smart links 500, 600, 700 conform to the generic URI syntax and structure set out in RFC 3986 and discussed above, and are thus "backwards compatible" with existing URI-handling mechanisms. For example, smart links 500, 600, 700 include scheme names 505, 605, 705; hierarchical portions 520, 620, 720, which include authority parts 510, 610, 710, and path parts 515, 615, 715; and query or "key/value" portions 540, 640, 740, which include previously-known key/value pairs 525A, 625A, 725A.

However, unlike prior-art URL 100, "key/value" portions 540, 640, 740 include "alternative-URL" key/value pairs 525B, 625B, 725B that encapsulate alternative-URL payloads 535B, 635B, 735B. Alternative-URL key/value pairs 525B, 625B, 725B also include predetermined alternative-URL keys 530B, 630B, 730B, which may be recognized as indicating the presence of an alternative-URL by URL-handling routines on various client devices, in accordance with various embodiments.

Exemplary smart links 500, 600, 700 identify a resource hosted by a device named "fb.com," the resource being identified according to the path "mu" and the key/value pair "v=wall". This resource ("mu/v=wall") is identified according to two different schemes: the ordinary http scheme, and a hypothetical scheme named "fbck". The hypothetical scheme "fbck" may be considered for simplicity of explanation to have identical syntax and structure to the ordinary http scheme. However, the systems and methods described herein are, with few exceptions, equally applicable to schemes that do not share syntax and/or structure.

Again for purposes of explanation, it is considered that some, but not all, client devices have installed a special-purpose application for accessing resources identified according to the fbck scheme; whereas virtually all client devices of interest have at least a general-purpose web browsing application for accessing resources identified according to the http scheme.

It is also assumed that users who have installed the special-purpose application on their client devices would prefer to access mu/v=wall via the special-purpose application, rather than via a general-purpose web browsing application. For example, the special-purpose application may offer extended functionality and/or be easier to use when accessing mu/v=wall, as compared to using a general-purpose web browsing application to access mu/v=wall via a web interface. Given this assumption that the special-purpose application is preferable to the general-purpose web browsing application for accessing mu/v=wall, one who wishes to distribute a link to the mu/v=wall resource is faced with a conundrum. If he or she distributes an URL according to the fbck scheme, then client devices that have the special-purpose application installed will access mu/v=wall in the preferred manner; however, client devices that do not have the special-purpose application installed will be unable to handle the fbck-scheme URL, and will be thus unable to access the resource. Contrariwise, If he or she distributes an URL identifying the resource according to the http scheme, then all client devices may be able to access the resource, but only via the less-desirable general-purpose web browsing application.

However, if the client devices of interest implement a URL-handling routine such as routine 900 or 1100 (see FIGS. 9-11, discussed below), then a compound URL or smart link such as smart links 500, 600, 700 would enable users of all the client devices to access the resource using the best-available application on their device.

The generation and use of these and other like smart links or compound URLs is discussed at length below, referring back to various components of smart links 500, 600, 700 as appropriate. The http-scheme and the hypothetical fbck-scheme are used throughout for explanation.

Figure 8:
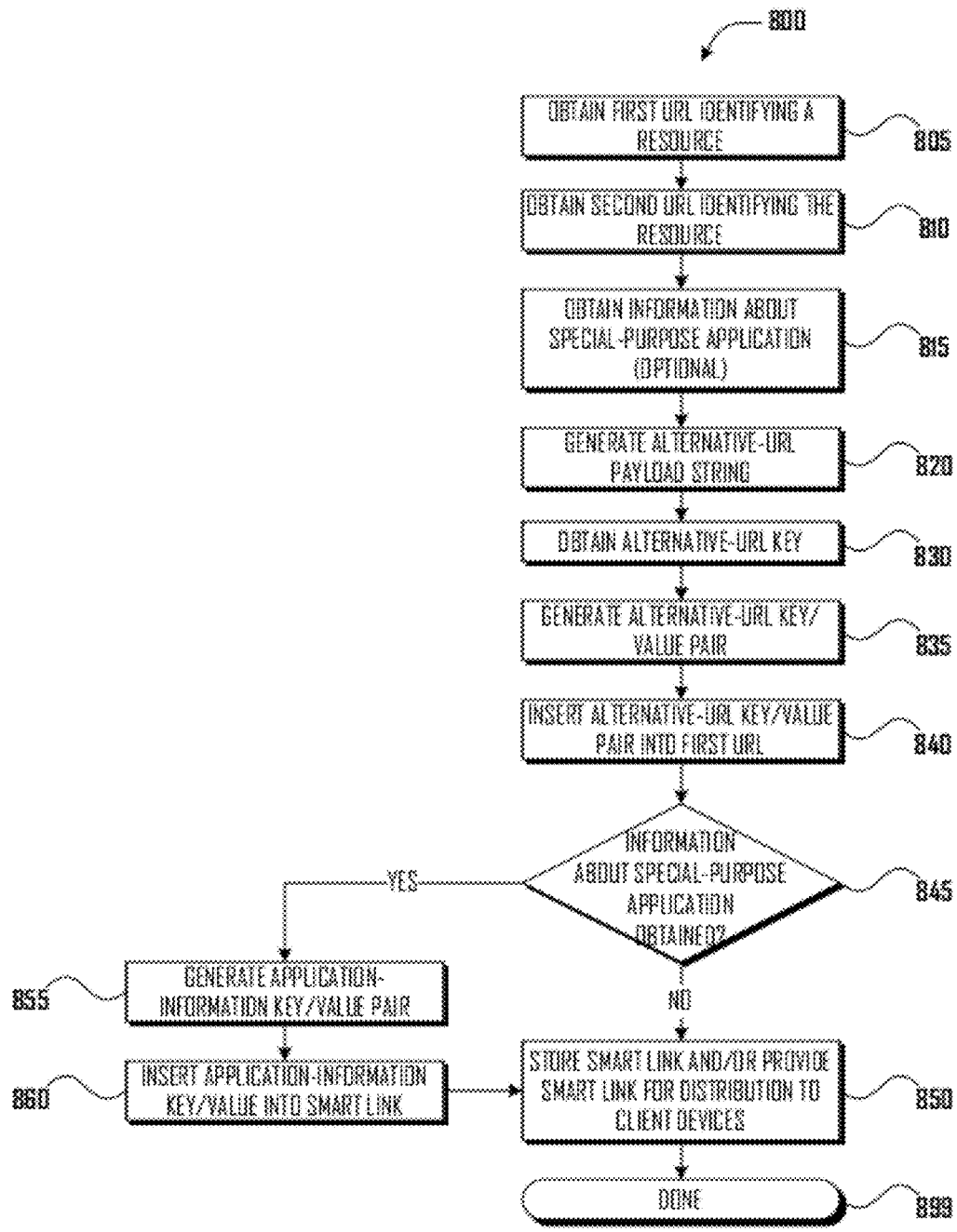
FIG. 8 illustrates a smart link generation routine, in accordance with one embodiment.

FIG. 8 illustrates a smart link generation routine 800, such as may be performed by smart link server 400 in accordance with one embodiment. In block 805, routine 800 obtains a first URL identifying a particular resource. In block 810, routine 800 obtains a second URL identifying the same resource. In most embodiments, the first URL and the second URL conform to the generic URI syntax and structure described in RFC 3986 and discussed above. For example, in one embodiment, routine 800 may obtain in block 805 an ordinary http-scheme URL such as "http://fb.com/mu?v=wall", and routine 800 may obtain in block 810 a non-http-scheme URL, such as "fbck://fb.com/mu?v=wall". In other embodiments, a non-http-scheme URL may be obtained in block 805, and an http-scheme URL may be obtained in block 810.

In various embodiments, the first and second URLs may be obtained from a data file, such as an HTML file, a text file, an XML file, or the like; from a database or other data store; from an input interface, such as a keyboard, camera, scanner, microphone, touch screen, or the like; from a network interface, such as via a web form, http request, or the like; or from another suitable source.

In alternate embodiments, the first URL and the second URL may not identify exactly the same resource. For example, in one embodiment, the first URL may identify a resource accessible only via a special-purpose application, such as a particular level in a gaming application. In such an embodiment, the second URL may identify a resource from which the gaming application may be obtained and installed on the device (e.g., the second URL may identify an application-store resource corresponding to the gaming application). In some embodiments, the converse may also be the case— the first URL may identify a resource from which a gaming application may be obtained and installed on the device, and the second URL may identify a resource accessible only via the special-purpose application.

In some embodiments, routine 800 may in block 815 optionally obtain additional information about a special-purpose application beyond information included in the first and/or second URLs. For example, in one embodiment, routine 800 may obtain information such as an application-identifier with which the special-purpose application may be identified in an application-store application or web page. In various embodiments, such additional information may or may not take the form of an URL.

In block 820, routine 800 generates an alternative-URL payload string encapsulating the second URL. For example, in one embodiment, routine 800 may percent-encode the second URL as described in RC 3986, or otherwise encode the second URL so that can be validly represented within the first URL according to the scheme named in the first URL. Briefly, the generic URI syntax and/or various scheme-specific syntaxes may define a set of reserved characters that are disallowed. For example, the generic URI syntax disallows a set of characters that are used as delimiters, including the following characters:

---

: / ? # [ ] @ ! $ & ' ( ) * + , ; =

---

In some embodiments, in block 820, routine 800 may replace such disallowed characters with an equivalent data octet using a substitution scheme. For example, according to the commonly-used percent-encoding scheme, the colon (":") character is encoded as "%3A", the forward-slash character ("/") is encoded as "%2F", the equals character ("=") is encoded as "%3D", the question mark character ("?") is encoded as "%3F", and so on. For example, in one embodiment, routine 800 may encapsulate the second URL into an alternative-URL payload as follows:

--- second URL: "fbck://fb.com/mu?v=wall"
alternative-URL payload:
"fbck%3A%2F%2Ffb.com%2Fmu%3Fv%3Dwall" (535B)

---

Alternately:

--- second URL: "http://fb.com/mu?v=wall"
alternative-URL payload:
"http%3A%2F%2Ffb.com%2Fmu%3Fv%3Dwall" (635B)

---

In some embodiments, routine 800 may additionally or alternately perform other operations to generates an alternative-URL payload, such as encrypting and/or obfuscating the second URL (or the encoded second URL).

In block 830, routine 800 obtains a key to indicate the presence of an alternative-URL payload within a smart link. For example, in one embodiment, routine 800 may obtain a key such as "appURI", 530B as shown in FIG. 5, or "altURI", 630B as shown in FIG. 6. In block 835, routine 800 generates an alternative-URL key/value pair including the alternative-URL key and the alternative-URL payload. For example, as shown in FIGS. 5 and 6, routine 800 may generate a key/value pair such as the following:

---

"appURI=fbck%3A%2F%2Ffb.com%2Fmu%3Fv%3Dwall" (525B)
"altURI=http%3A%2F%2Ffb.com%2Fmu%3Fv%3Dwall" (625B)

---

In block 840, routine 800 inserts the alternative-URL key/value pair into the key/value portion of the first URL, creating thereby a compound URL or smart link. A smart link thus created will conform to the generic URI syntax and structure described in RFC 3986 and discussed above, assuming that the first URL is so conformant.

In most embodiments, one or more pre-determined alternative-URL keys may be established by convention and/or standards to indicate such payloads. As discussed above, the alternative-URL key is inserted into the key/value portion of the first URL to form a compound URL or smart link; therefore, in most embodiments, it may be desirable that the alternative-URL key be a key that is unlikely to be used for other purposes. For example, commonly-used keys such as "id", "q", "tab", and the like would be unsuitable alternative-URL keys, as their insertion into the first URL would likely break many existing web applications or services. For purposes of illustration, alternative-URL keys such as "appURI" and "altURI" are used herein, but other embodiments are not limited to these exact keys. Rather, any arbitrary string may be adopted, so long as at least some client devices recognize the string as indicating the presence of an alternative-URL payload within a smart link (as discussed below in reference to FIG. 10). Most web applications ignore unknown key-value pairs. For example, the web host named tools.ietf.org treats URLs (a) and (b) identically, as the key "foo" is not recognized by that host.

---

(a) http://tools.ietf.org/html/rfc3986#section-3.1
(b) http://tools.ietf.org/html/rfc3986?foo=bar#section-3.1

---

Similarly the web host named en.wikipedia.org treats URL (c) and smart link (d) identically, as the alternative-URL key "appURL" is not recognized by that host.

---

(c) http://en.wikipedia.org/w/index.php?title=URI_scheme&oldid=400713352
(d) http://en.wikipedia.org/w/index.php?title=URI_scheme&oldid=400713352&appURL=wiki%3A%2F%2Fen.wikipedia.-org%2Fw%2Findex.php%3Ftitle%3DURI_scheme%26oldid%-3D400713352

---

Accordingly, alternative-URL keys that are not likely to be used by existing web applications are not likely to break those web applications, maintaining backwards compatibility for smart links.

Referring again to FIG. 8, in decision block 845, routine 800 determines whether, in optional block 815, it obtained additional information about a special-purpose application. If not, then in block 850, routine 800 stores the smart link generated in block 840 in a transient or persistent memory, provides the smart link back to a requestor for distribution to one or more client devices, and/or distributes the smart link to one or more client devices. In some embodiments, providing the smart link for distribution may include encoding the smart link into a machine-scannable optical code, such as a two-dimensional barcode (e.g., QR Codes, Data Matrix codes, High Capacity Color Barcodes, and the like). FIG. 12, discussed below, illustrates two QR Codes that are encoded with smart links.

Within a smart link, the first URL may be referred to herein as the "primary" and the second, encapsulated, URL may be referred to as the alternative URL, when it is necessary to make a distinction. For example, in smart link 500 (aka compound URL 500), the "primary" URL includes primary scheme 505, primary hierarchical portion 520, and key/value pair 525A, while the alternative URL is encapsulated in key/value pair 525B. These designations do not imply that the first URL has primacy over the alternative URL. Rather, in various embodiments, either the primary or the alternative URL may represent a preferred scheme for accessing a resource.

If, however, routine 800 determines in decision block 845 that it obtained additional information about a special-purpose application, then in block 855, routine 800 generates an application-information key/value pair including the application-information key and a payload encapsulating the application-information key (possibly percent-encoded, as described above). In block 860, routine 800 inserts the application-information key/value pair into the smart link generated in block 840 before storing and/or providing the smart link for distribution in block 850, as discussed above.

Routine 800 ends in block 899. In some embodiments, routine 800 may be performed sequentially or in parallel to generate additional smart links.

FIG. 7 illustrates an alternate embodiment of a smart link 700 including such an application-information key/value pair 725C, which includes application-information key 730C and an application-information payload 735C representing an ID-number corresponding to an application that can handle the alternative-URL scheme. Smart link 700 represents an alternate embodiment of a smart link that differs from smart links generated according to routine 800, discussed above. As discussed above, the hypothetical fbck scheme shares identical syntax and structure to the http scheme. Accordingly, in this special case, a complete alternative URL may be obtained by simply replacing the smart link's primary scheme 705 with the provided alternative scheme 735B. Such embodiments that encapsulate only a portion of a complete alternative URL may use an alternative-URL key 730B that differs from alternative-URL keys that indicate the presence of a complete alternative URL (e.g., as described above in reference to FIG. 8).

Figure 9:
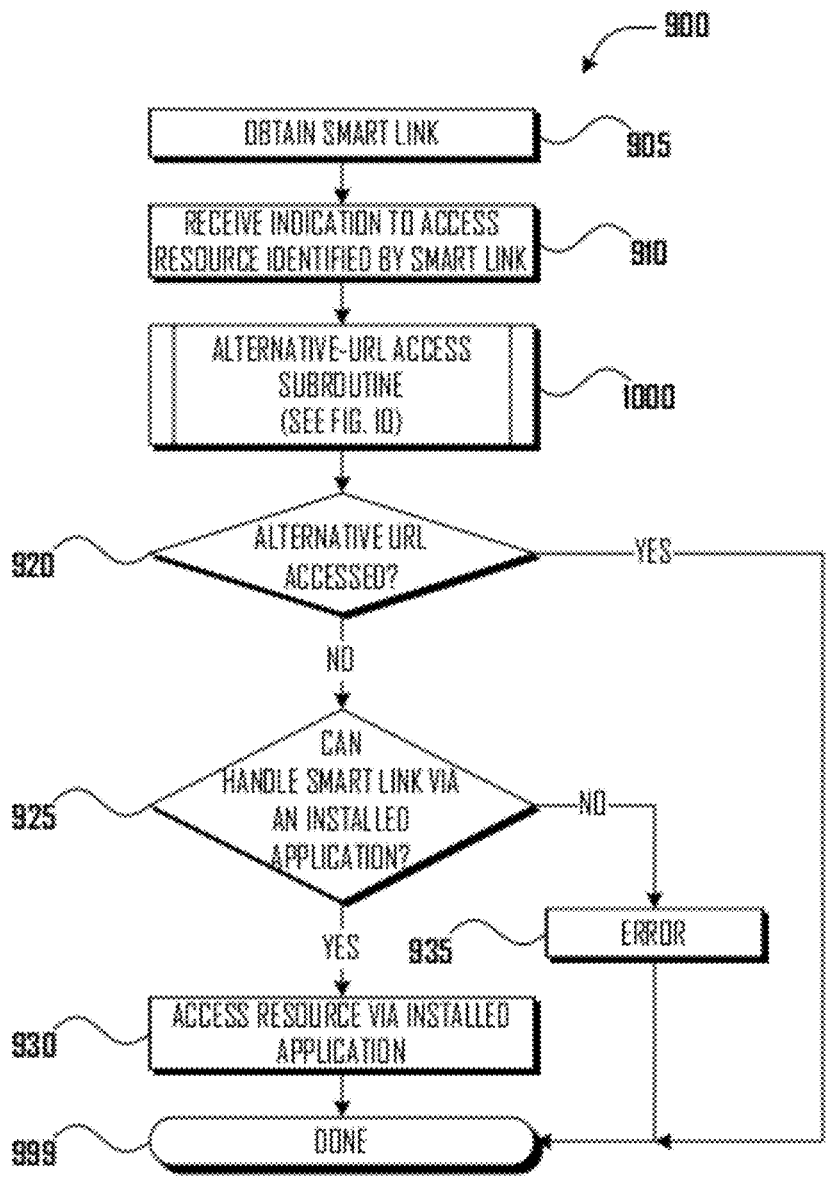
FIG. 9 illustrates an exemplary "preferred" URL smart link handling routine, in accordance with one embodiment.
Figure 11:
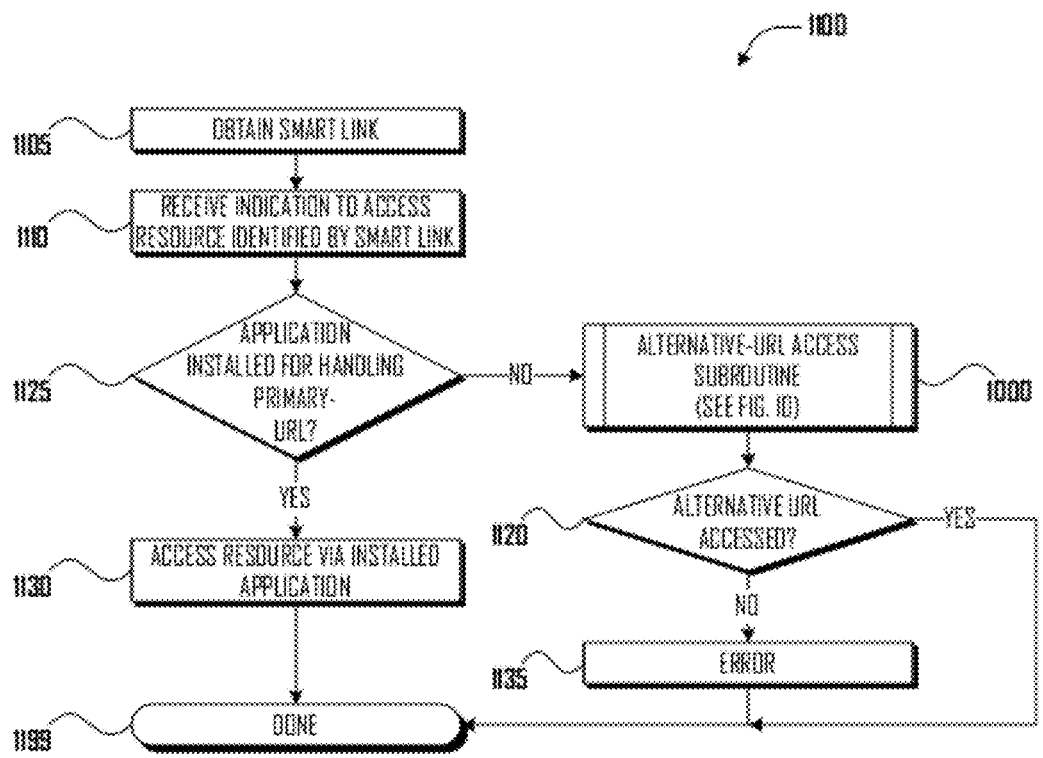
FIG. 11 illustrates an exemplary "fallback" URL smart link handling routine, in accordance with one embodiment.

FIG. 9 illustrates an exemplary smart link handling routine 900, in accordance with one embodiment in which a "preferred" URL is encapsulated as an alternative URL within a smart link. FIG. 11, discussed below, illustrates a similar smart link handling routine 1100, in accordance with embodiments in which a "fallback" URL is encapsulated as an alternative URL within a smart link.

Referring to FIG. 9, in block 905, routine 900 obtains a smart link, e.g., by receiving or reading an html document, email, or other link-bearing data. As discussed above, smart links will conform to the generic URI syntax and structure described in RFC 3986 and discussed above, as long as the first URL from which it was generated was so conformant. Thus, the smart link or compound URL received in block 905 identifies a particular resource by naming a primary scheme, which refers to a specification for assigning identifiers within the primary scheme, a hierarchical portion (including an authority and/or path), and a key/value portion, which includes at least one key/value pair.

In block 910, routine 900 receives an indication to access a resource identified by the smart link. For example, in one embodiment, a user of the device that is performing routine 900 may indicate to access the smart link by tapping, clicking, or otherwise selecting the smart link via an input associated with the device.

In subroutine block 1000, routine 900 calls alternative-URL access subroutine 1000 (see FIG. 10, discussed below). In decision block 920, routine 900 determines whether subroutine 1000 returned a value indicating that an alternative application was used to access a resource identified by the smart link. If such an alternative application was so used, then routine 900 ends in block 999.

Otherwise, in decision block 925, routine 900 determines whether an application is installed for accessing resources according to the primary scheme, and if so, in block 930, routine 900 invokes or calls the installed application to access the resource. In some embodiments, this invocation operation may include passing the smart link to the installed application. If the smart link cannot be handled by an installed application, then routine 900 indicates an error handling the smart link in block 935.

For example, in some embodiments, an operating system or other shared resource may provide a mechanism for querying whether an application is installed and/or has registered as being able to handle the primary scheme. In such embodiments, routine 900 may identify an appropriate installed application and pass the smart link to that application in block 930. In other embodiments, routine 900 may simply ask the operating system or other shared resource on the device to open the smart link in block 925, and if the "open" operation fails, routine 900 may indicate an error in block 935.

Routine 900 ends in block 999.

Figure 10:
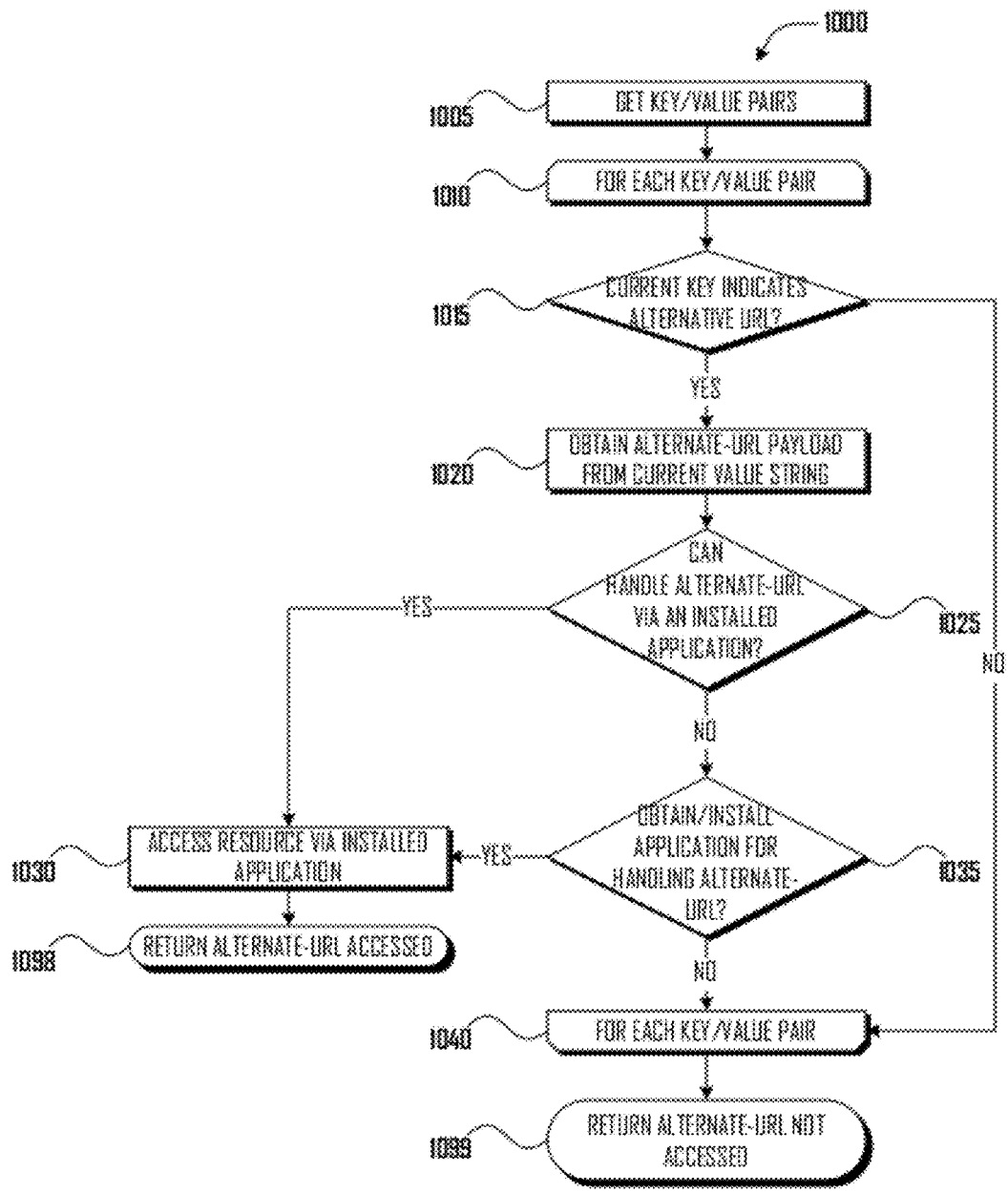
FIG. 10 illustrates an alternative-URL access subroutine, in accordance with one embodiment.

FIG. 10 illustrates an alternative-URL access subroutine 1000, in accordance with one embodiment. In block 1005, subroutine 1000 begins by getting one or more key/value pairs of a smart link (e.g., that were passed in as part of a smart link by a calling routine). Beginning in starting loop block 1010, subroutine 1000 processes the key/value pairs individually.

In decision block 1015, subroutine 1000 determines whether the key of the current key/value pair indicates that the current key/value pair is an alternative-URL key/value pair that encapsulates an alternative URL. For example, subroutine 1000 may determine whether the current key matches any of a list of one or more pre-determined alternative-URL keys. If the current key/value pair is not indicated to be an alternative-URL key/value pair, then subroutine 1000 proceeds to ending loop block 1040, and iterates back to block 1010 to process the next key/value pair (if any).

However, if the current key/value pair is indicated to be an alternative-URL key/value pair, then in block 1020, subroutine 1000 obtains an alternate-URL payload from the current value-string. For example, in one embodiment, subroutine 1000 may substitute zero or more encoded data octets in the current value-string for equivalent characters (e.g., by reversing a percent-encoding process, such as that described above) to obtain an alternate-URL payload. In other embodiments, subroutine 1000 may perform other operations to transform the current value-string into an alternate-URL payload, such as decrypting or de-obfuscating the current value-string. In some embodiments, the alternate-URL payload will conform to the generic URL syntax and structure described in RFC 3986 and discussed above, and will thus include an alternative scheme and hierarchical portion, and optionally, a key/value portion. In alternate embodiments, the alternate-URL payload may include a partial URL from which a complete alternative URL may be formed. For example, in one embodiment, the alternative-URL payload may consist of only an alternative scheme, in which case a complete alternative-URL may be formed by copying the alternative scheme to replace the primary scheme in the compound URL.

In block 1025, subroutine 1000 determines whether the alternative URL can be handled by an installed application for accessing resources according to the alternative scheme named by the alternative URL.

For example, in some embodiments, an operating system or other shared resource may provide a mechanism for querying whether an application is installed and/or has registered as being able to handle the primary scheme. In such embodiments, routine 1000 may identify an appropriate installed application and pass the smart link to that application in block 1030. In other embodiments, routine 1000 may simply ask the operating system or other shared resource on the device to open the smart link in block 1025, and if the "open" operation fails, routine 1000 may proceed to decision block 1035. In decision block 1035, subroutine 1000 determines whether it can obtain and/or install an application for handling the alternative-URL scheme. For example, in some embodiments, a key/value pair of the smart link may include information from which an appropriate application may be identified and presented to the user to purchase and/or download and install. In other embodiments, subroutine 1000 may query the user for an appropriate application or otherwise attempt to identify an appropriate application without using additional information from the smart link.

If the alternative-URL is determined to be able to be handled in either block 1025 or block 1035, then in block 1030, subroutine 1000 invokes or calls an installed application to access the resource. In some embodiments, this invocation operation may include passing the smart link to the installed application. Then, subroutine 1000 returns in block 1098, indicating that the alternative resource was accessed.

However, if in block 1035, no application was able to handle the alternative-URL, then in ending loop block 1040, subroutine 1000 iterates back to block 1010 to process the next key/value pair (if any).

If all key/value pairs are processed without accessing an alternative resource, then subroutine 1000 ends in block 1099, indicating that no alternative resource was accessed.

FIG. 11 illustrates an exemplary smart link handling routine 1100, in accordance with one embodiment in which a "fallback" URL is encapsulated as an alternative URL within a smart link.

In block 1105, routine 1100 obtains a smart link, e.g., by receiving or reading an html document, email, or other link-bearing data. As discussed above, smart links will conform to the generic URI syntax and structure described in RFC 3986 and discussed above, as long as the first URL from which it was generated was so conformant. Thus, the smart link or compound URL received in block 1105 identifies a particular resource by naming a primary scheme, which refers to a specification for assigning identifiers within the primary scheme, a hierarchical portion (including an authority and/or path), and a key/value portion, which includes at least one key/value pair In block 1110, routine 1100 receives an indication to access a resource identified by the smart link. For example, in one embodiment, a user of the device that is performing routine 1100 may indicate to access the smart link by tapping, clicking, or otherwise selecting the smart link via an input associated with the device.

In decision block 1125, routine 1100 determines whether an application is installed for accessing resources according to the primary scheme, and if so, in block 1130, routine 1100 invokes or calls the installed application to access the resource, and routine 1100 ends in block 1199. In some embodiments, this invocation operation may include passing the smart link to the installed application. If the smart link cannot be handled by an installed application, then routine 1100 calls alternative-URL access subroutine 1000 (see FIG. 10, discussed above).

For example, in some embodiments, an operating system or other shared resource may provide a mechanism for querying whether an application is installed and/or has registered as being able to handle the primary scheme. In such embodiments, routine 1100 may identify an appropriate installed application and pass the smart link to that application in block 1130. In other embodiments, routine 1100 may simply ask the operating system or other shared resource on the device to open the smart link in block 1125, and if the "open" operation fails, routine 1100 calls alternative-URL access subroutine 1000 (see FIG. 10, discussed above).

In decision block 1120, routine 1100 determines whether subroutine 1000 returned a value indicating that an alternative application was used to access a resource identified by the smart link. If such an alternative application was so used, then routine 1100 ends in block 1199. Otherwise, routine 1100 indicates an error handling the smart link in block 1135, and routine 1100 ends in block 1199.

FIG. 12 shows a pair of optically machine-scannable codes 1205, 1210 (here, two-dimensional barcodes, or more specifically, QR Codes) encoded with the following smart link, in accordance with one embodiment:

--- http://www.facebook.com/maruthecat?v=wall&appURI=
 fbck%3A%2F%2Fwww.facebook.com%2Fmaruthecat%3Fv%3Dwall

---

Machine-scannable code 1205 encodes the entire smart link string as raw data. Machine-scannable code 1210 encodes a "short" URL that re-directs to the smart link. Machine-scannable code 1210 therefore is less information-dense than machine-scannable code 1205, and in some embodiments, machine-scannable code 1210 may be easier to scan, especially on client devices with limited image-capture capabilities.

Table 1-Table 4 illustrate various exemplary smart links (and constituent components thereof) in accordance with various embodiments, as described herein.

TABLE 1

| | |
|---|---|
| primary URL | sms:+15105550101?body=hello%20there |
| alternative URL | mailto:me@example.com?body=hello %20there |
| smart link | sms:+15105550101?body=hello%20there&altURI=mailto%3Ame%40example.com%3F%20body%3Dhello%2520there |

In one embodiment, the smart link shown in Table 1 might be provided to preferably invoke an email application on a client device such as a smart phone, desktop/laptop computer, or the like. On other client devices, such as feature phones that may lack an email application, an SMS application may be invoked.

TABLE 2

| | |
|---|---|
| primary URL | tel:+1-816-555-1212 |
| alternative URL | gvoice:+1-816-555-1212 |
| smart link | tel:+1-816-555-1212?altURI=gvoice%3A%2B1-816-555-1212 |

In one embodiment, the smart link shown in Table 2 might be provided to preferably invoke a free or low-cost phone call application if one is installed on a client device such as a smart phone, desktop/laptop computer, or the like. On other client devices, such as feature phones or smart phones that do not have such an application installed, a standard phone dialer may be invoked.

TABLE 3

| | |
|---|---|
| primary URL | http://torrents.example.org/example.torrent |
| alternative URL | magnet:?xt=urn:btih:41c599438e5971ed959b93296n=example |
| smart link | http://torrents.example.org/example.torrent?altURI=magnet%3A%3Fxt%3Durn%3Abtih%3A41c599438e5971ed959b93296n%3Dexample |

In one embodiment, the smart link shown in Table 3 might be provided to preferably invoke a peer-to-peer file sharing application, if one is installed on a client device, to obtain an identified file. On other client devices that do not have such an application installed a general-purpose web browser may be invoked.

TABLE 4

| | |
|---|---|
| primary URL | geo:47.611950,-122.337570 |
| alternative URL | http://maps.google.com/maps?q=47.611950,+-122.337570&num=1&t=h&sll=47.610531,-122.337913&sspn=0.071946,0.071946&hl=en&ie=UTF8&ll=47.61195,-122.33757&spn=0.007189,0.011276&z=17&iwloc=A |
| smart link | geo:47.611950,-122.337570&altURI=http%3A%2F%2Fmaps.google.com%2Fmaps%3Fq%3D47.611950%2C%2B-122.337570%26num%3Dl%26t%3Dh%26sll%3D47.610531%2C-122.337913%26sspn%3D0.071946%2C0.071946%26hl%3Den%26ie%3DUTF8%2611%3D47.61195%2C-122.33757%26spn%3D0.007189%2C0.011276%26z%3D17%26iwloc%3DA |

In one embodiment, the smart link shown in Table 4 might be provided to invoke a special-purpose map application if one is installed on a client device. On other client devices that do not have such an application installed a general-purpose web browser may be invoked as a fallback.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for accessing a compound Uniform Resource Locater ("URL"), the method comprising:

obtaining, by a client device, an indication to access a particular resource identified by the compound URL, the compound URL identifying said particular resource according to at least a primary scheme-name, a hierarchical portion, and a key/value portion, said key/value portion including at least one key/value pair;

parsing said key/value portion, by said client device, to determine whether said at least one key/value pair includes an alternative-URL key/value pair identified according to a predetermined alternative-URL key; and
when said at least one name/value pair is determined to include said alternative-URL key/value pair:
  extracting a value string from said alternative-URL key/value pair, said value string encapsulating an alternative-URL payload representing at least an alternate scheme-name;

determining whether an alternative-application for accessing resources according to said alternate scheme-name is installed on the computer; and when said alternative-application is installed on the computer, invoking said alternate application to access said particular resource.

2. The method of claim 1, further comprising, prior to parsing said key/value portion, determining that no primary-application for accessing resources according to said primary scheme-name is installed on the computer, and wherein parsing said key/value portion is performed in response to said determining that no such primary-application is installed on the computer.

3. The method of claim 1, further comprising, when said alternative-application is not installed on the computer:

determining that a primary-application for handling said primary scheme-name is installed on the computer; and
invoking said primary-application to access said particular resource.

4. The method of claim 3, wherein invoking said primary-application to access said particular resource comprises passing the compound URL to said primary-application.

5. The method of claim 3, wherein said primary scheme-name is an http scheme-name, and wherein said primary-application comprises a general-purpose web-browsing application standardly installed on said client device.

6. The method of claim 1, wherein said alternate scheme-name is a non-http scheme-name, and wherein said alternate application comprises a special-purpose application optionally installed on said client device.

7. The method of claim 1, further comprising, when said at least one name/value pair is determined to include said alternative-URL key/value pair, determining an alternate URL identifying said particular resource according to at least said alternate scheme-name and an alternate hierarchical portion.

8. The method of claim 7, wherein determining said alternate URL comprises decoding said alternative-URL payload to obtain said alternate URL.

9. The method of claim 1, wherein obtaining said indication to access a particular resource identified by the compound URL comprises optically scanning a machine-scannable code encoded with the compound URL.

10. A non-transitory computer-readable storage medium storing instructions that, when executed by a processor, perform the method of claim 1.

11. A computing apparatus comprising a processor and a storage medium storing instructions that, when executed by the processor, perform the method of claim 1.

12. A computer-implemented method for encoding an alternative Uniform Resource Locater ("URL") into a compound URL, the method comprising:
  obtaining, by the computer, a first URL identifying a particular resource that is accessible via a first application on a first plurality of client devices and a second application on a second plurality of client devices, said first URL comprising a first scheme-name, which refers to a first identifier-scheme that can be handled by said first application, but that cannot be handled by said second application, a first hierarchical portion, and a first key/value portion including zero or more key-value pairs;
  obtaining, by the computer, a second URL identifying said particular resource, said second URL comprising a second scheme-name referring to a second identifier-scheme that can be handled by said second application, but that cannot be handled by said first application;
  generating, by the computer, an alternative-URL payload string that can be validly represented within said first URL according to said first identifier-scheme and that encapsulates information sufficient to indicate said second URL;
  obtaining, by the computer, a predetermined alternative-URL key recognized by URL-handling routines on said second plurality of client devices as indicating the presence of an alternative URL;
  generating, by the computer, an alternative-URL key/value pair comprising said predetermined alternative-URL key and said alternative-URL payload string;
  inserting, by the computer, said alternative-URL key/value pair into said first key/value portion to form an alternative-URL-encoded compound URL; and
  storing said alternative-URL-encoded compound URL in a memory associated with the computer.

13. The method of claim 12, further comprising providing, by the computer, said alternative-URL-encoded compound URL for transmission to said first and said second pluralities of client devices, such that said particular resource can be accessed on any given client device by a selected one of said first application and said second application.

14. The method of claim 13, wherein providing said alternative-URL-encoded compound URL comprises:
  encoding said alternative-URL-encoded compound URL into an optically machine-scannable code; and
  providing said optically machine-scannable code for transmission to said first and said second pluralities of client devices.

15. The method of claim 12, wherein generating said alternative-URL payload string comprises encoding, by the computer, said second URL into an encoded second URL that can be validly represented within said first URL according to said first identifier-scheme.

16. The method of claim 15, wherein encoding said second URL into said encoded second URL comprises:
  determining, by the computer, a set of reserved characters that are disallowed according to said first identifier-scheme; and
  encoding, by the computer, said second URL into said encoded second URL such that any members of said set of reserved characters that appear in said second URL are represented in said encoded second URL by an equivalent data octet.

17. The method of claim 12, wherein said first URL and said second URL are identical except for said first scheme-name and said second scheme-name.

18. The method of claim 17, wherein generating said alternative-URL payload string comprises copying said second scheme-name into said alternative-URL payload string.

19. A non-transitory computer-readable storage medium storing instructions that, when executed by a processor, perform the method of claim 12.

20. A computing apparatus comprising a processor and a storage medium storing instructions that, when executed by the processor, perform the method of claim 12.

* * * * *